United States Patent
Rozsa et al.

(10) Patent No.: US 9,535,309 B2
(45) Date of Patent: Jan. 3, 2017

(54) COMPENSATOR SYSTEM AND METHOD FOR COMPENSATING ANGULAR DISPERSION

(75) Inventors: Balazs Rozsa, Budapest (HU); Gergely Katona, Budapest (HU); Mate Veress, Budapest (HU); Pal Maak, Budapest (HU); Gergely Szalay, Budapest (HU)

(73) Assignee: Femtonics Kft., Budapest (HU)

(*) Notice: Subject to any disclaimer, the term of this patent is extended or adjusted under 35 U.S.C. 154(b) by 227 days.

(21) Appl. No.: 14/368,937

(22) PCT Filed: Jan. 5, 2012

(86) PCT No.: PCT/HU2012/000003
§ 371 (c)(1),
(2), (4) Date: Oct. 13, 2014

(87) PCT Pub. No.: WO2013/098568
PCT Pub. Date: Jul. 4, 2013

(65) Prior Publication Data
US 2015/0029578 A1    Jan. 29, 2015

(30) Foreign Application Priority Data
Dec. 28, 2011  (HU) .................................. P1100727

(51) Int. Cl.
*G02F 1/33*     (2006.01)
*G02B 21/00*    (2006.01)
(Continued)

(52) U.S. Cl.
CPC . *G02F 1/33* (2013.01); *G02B 5/04* (2013.01); *G02B 21/002* (2013.01);
(Continued)

(58) Field of Classification Search
CPC ......... G02F 1/33; G02B 5/04; G02B 21/0028; G02B 21/002; G02B 27/0025; G02B 27/0031; G02B 27/005; G02B 27/0056; G02B 27/0062
(Continued)

(56) References Cited

U.S. PATENT DOCUMENTS 6,281,948 B1   8/2001  Deter
7,227,127 B2   6/2007  Saggau et al.
(Continued)

FOREIGN PATENT DOCUMENTS

WO    WO 2010/076579 A1    7/2010

OTHER PUBLICATIONS

Kaplan, A. et al., Acousto-optic lens with very fast focus scanning, Optics Letters, Jul. 15, 2001, pp. 1078-1080, vol. 26, No. 14.
(Continued)

*Primary Examiner* — Thomas K Pham
*Assistant Examiner* — Marin Pichler
(74) *Attorney, Agent, or Firm* — Olson & Cepuritis, Ltd.

(57) ABSTRACT

The invention relates to a compensator system adapted to compensate for the angular dispersion of electromagnetic beams deflected by at least one acousto-optic deflector of an optical system, wherein the angular dispersion of each deflected beam is dependent on the deflection angle obtained by the deflecting acoustic frequency of the acousto-optic deflector, characterized in that the compensator system comprises: —a first lens group for spatially separating the deflected beams of different deflection angle and angular dispersion by focusing the beams substantially into the focal plane, —a compensator element having a first surface and a second surface, and being arranged such that the first surface of the compensator element lies substantially in the focal
(Continued)

plane of the first lens group, and the first and second surfaces of the compensator element have nominal radiuses $R_1$ and $R_2$ that together work as prisms with tilt angles $\beta$ and prism opening angles $\alpha_p$ that vary with the distance from the optical axis so as to compensate for the angular dispersion of the spatially separated deflected beams, —a second lens group arranged so as to substantially parallelize the different wavelength components of each deflected beam exiting the compensator element while maintaining the angular variation of the beams deflected at different acoustic frequencies. The invention further relates to method for compensating for the angular dispersion of electromagnetic beams deflected by at least one acousto-optic deflector of an optical system, wherein the angular dispersion of each deflected beam is dependent on the deflection angle obtained by the deflecting acoustic frequency, characterized by —spatially separating the deflected beams of different deflection angle and angular dispersion by focusing the beams via a first lens group substantially into the focal plane of the first lens group, —compensating for the angular dispersion of the spatially separated deflected beams in accordance with the angular dispersion of the given beam, —substantially parallelizing the spectral components of each deflected beam while maintaining the angular variation of the beams deflected at different acoustic frequencies.

8 Claims, 5 Drawing Sheets

(51) Int. Cl.
  *G02B 27/00* (2006.01)
  *G02B 5/04* (2006.01)
  *G02B 27/30* (2006.01)

(52) U.S. Cl.
  CPC ...... *G02B 21/0036* (2013.01); *G02B 27/0031* (2013.01); *G02B 27/30* (2013.01)

(58) Field of Classification Search
  USPC ...................................... 359/305–309; 398/81
  See application file for complete search history.

(56) References Cited

U.S. PATENT DOCUMENTS

2009/0290209 A1   11/2009   Kubo
2010/0328759 A1*  12/2010   Kirkby ............... G01N 21/6458
                                               359/310

OTHER PUBLICATIONS

Zeng, S. et al., Analysis of the dispersion compensation of acousto-optic deflectors used for multiphoton imaging, Journal of Biomedical Optics, Mar./Apr. 2007, pp. 024015-1-024015-7, vol. 12(2).

* cited by examiner

COMPENSATOR SYSTEM AND METHOD FOR COMPENSATING ANGULAR DISPERSION

CROSS-REFERENCE TO RELATED APPLICATIONS

This application is a U.S. National Phase of PCT/HU2012/000003, filed Jan. 5, 2012, which claims priority of Hungarian Patent Application No. P1100727, filed Dec. 28, 2011, each of which is incorporated herein by reference.

The present invention relates to a compensator system and method adapted to compensate for the angular dispersion of electromagnetic beams deflected by at least a pair of acousto-optic deflectors of an optical system, wherein the angular dispersion of each deflected beam is dependent on the deflection angle obtained by the deflecting acoustic frequencies of the acousto-optic deflectors.

Three-dimensional (3D) random access laser scanning technologies have great importance in performing measurements on biological specimens (including scanning, imaging, detection, excitation, etc.) e.g. imaging biological structures or mapping fluorescent markers of cell surface receptors or performing measurements such as uncaging/photosimulation, FRET (Fluorescence resonance energy transfer), FLIM (Fluorescence lifetime imaging), etc.

Commonly used 3D laser scanning microscopes are either confocal microscopes or multi-photon (two-photon) microscopes. In the confocal microscope technology a pinhole is arranged before the detector to filter out light reflected from any other plane than the focus plane of the microscope objective. Thereby it is possible to image planes lying in different depths within a sample (e.g. a biological specimen).

Two-photon laser scanning microscopes use a laser light of lower energy of which two photons are needed to excite a flourophore in a quantum event, resulting in the emission of a fluorescence photon, which is then detected by a detector. The probability of a near simultaneous absorption of two photons is extremely low requiring a high flux of excitation photons, thus two-photon excitation practically only occurs in the focal spot of the laser beam, where the beam intensity overcomes the two-photon threshold. The photon number is increased also by mode-locking the excitation laser causing photons to arrive in high intensity bounces at the sample. Generally a femtosecond pulsed laser is used to provide the required photon flux for the two-photon excitation, while keeping the average laser beam intensity sufficiently low to avoid thermal sample deterioration.

When applying either of the above-mentioned technologies the 3D scanning is conventionally carried out by moving the sample stage e.g. via stepping motors, however this is complicated to implement when using submerge specimen chambers or when electrical recording is performed on the biological specimen with microelectrodes. The movement of the sample stage is a slow process, allowing either minute order imaging speed or very low (kpixel) number of measurement points thus low resolution. Accordingly, in the case of analysing biological specimens it is often preferred to move the focus spot of the laser beam instead of moving the specimen. This can be achieved by deflecting the laser beam to scan different points in a focal plane (XY plane) and by displacing the objective along its optical axis (Z axis) e.g. via a piezo-positioner to change the depth of the focal plane. XY scanning is conventionally achieved by deflecting the laser beam within a given focal plane (XY plane) via mechano-optical deflecting means such as deflecting mirrors mounted on galvanometric scanners.

The inertia of the mechanical scanning components (i.e. the scanning mirrors and the microscope objective) presents certain limitations with regard to the achievable scanning speed, since the scanning components need to be physically displaced in order to perform 3D scanning.

Rapid acousto-optic deflectors (AOD) have been proposed as an alternative to the conventional mechano-optic solutions.

Kaplan et al. ("Acousto-optic lens with very fast focus scanning", OPTICS LETTERS/Vol. 26, No. 14/July 15, (2001)) proposed an acousto-optic lens made up of two AODs with counter propagating acoustic waves locked in phase, to achieve purely focal plane shift along the z axis without lateral moving of the beam. Changing the focus of the acousto-optic lens is achieved by changing the sweep rate of the acoustic frequencies through the acousto-optic devices.

In U.S. Pat. No. 7,227,127 the above principle is made use of in order to provide 3D scanning. The focus of the beam can be moved in space in a diamond like volume by using four acousto-optic deflectors, two for both lateral directions (x and y). Lateral scanning is a result of the acoustic frequency differences of the two AODs diffracting in the same lateral direction, whereas depth focusing (i.e. focus shift along the z axis) is achieved by changing the sweep rate of the acoustic frequencies in the same AODs. Thus the focus point can be quasi independently adjusted in the x-z and y-z planes, where z is the longitudinal direction corresponding to the optical axis of the device. This also leads to strong astigmatism, when the acoustic frequency sweep rates in the x and y deflecting units are not perfectly matched.

However there are various problems associated with the state of the art AOD 3D scanning technology such as spatial and temporal dispersion, especially when applied in combination with multi-photon scanning technologies.

Prior art AOD systems eliminate spatial dispersion to a more or less extent by applying various dispersion compensating elements between the AODs or by special arrangement of the pair of AODs as discussed in WO2010/076579. Nevertheless, prior art optical arrangements were unable to reduce the angular dispersion of the AODs to a sufficient extent, mainly because of its spatial non-uniformity.

A known way of collimating an optical beam with angular dispersion is to place a prism 10 in the optical path as illustrated in FIG. 1. The incident beam 12b comprises different wavelength components of which the longest wavelength component $\lambda_{long}$, the centre wavelength component $\lambda_{centre}$ and the shortest wavelength component $\lambda_{short}$ is indicated. In the illustrated optical arrangement the incident beam 12b is produced by passing an original beam 12a through a first prism 10a, such that the original beam 12a is incident on the first prism 10a at Brewster's angle $\alpha_{Brewster}$. The first prism 10a separates the different wavelength components of the original beam 12a thereby introducing angular dispersion. The second prism 10 has the same prism opening angle $\alpha_p$ as the first prism 10. After the second beam 12b with the angular dispersion passes through the second prism 10b the different wavelength components $\lambda_{long}$, $\lambda_{center}$ and $\lambda_{short}$ are collimated, i.e. the wavelength components $\lambda_{long}$, $\lambda_{center}$ and $\lambda_{short}$ of the third refracted beam 12c propagate parallel to each other but with a wavelength dependent position. Accordingly a prism can be used to compensate for angular dispersion introduced by a pair of AODs as suggested by Shaoqun Zeng et al. in Analysis of the dispersion compensation of acousto-optic deflectors used for multiphoton imaging (J. Biomed. Opt. 12, 024015 (Mar. 9, 2007); doi:10.1117/1.2714061). In practice, however, the angular dispersion is dependent of the applied acoustic frequency, hence a single prism is not sufficient to compensate for the angular dispersion at all frequencies.

It is an object of the invention to overcome the problems associated with the prior art laser scanning microscopes and in general any optical system comprising acousto-optic deflectors which introduces angular dispersion into a deflected optical beam.

In particular, it is an object of the invention to provide an angular dispersion compensator system, which reduces the wavelength dependence of the deflection angle of a deflected optical beam.

The inventors have realised that the angular dispersion compensating property of a prism can be made use of in an optical system wherein the angular dispersion of an electromagnetic beam is dependent on the distance from the optical axis of the optical system by providing a compensator having two surfaces that together work like prisms with varying and matching incidence and opening angles. The inventors have also realised that in a laser scanning microscope wherein acousto-optic deflectors (AODs) are used for deflecting the scanning laser beam, a first lens group can be used to focus the deflected beams into a focal plane corresponding to one of the surfaces of such a compensator, whereby the beams of different angular dispersion are separated spatially allowing for compensating for the angular dispersion independently for each beam by the appropriately shaped compensator.

The above objects are achieved by the compensator system according to claim 1 and the method according to claim 5.

Further advantageous embodiments of the invention are defined in the attached dependent claims.

Further details of the invention will be apparent from the accompanying figures and exemplary embodiments.

Figure 2:
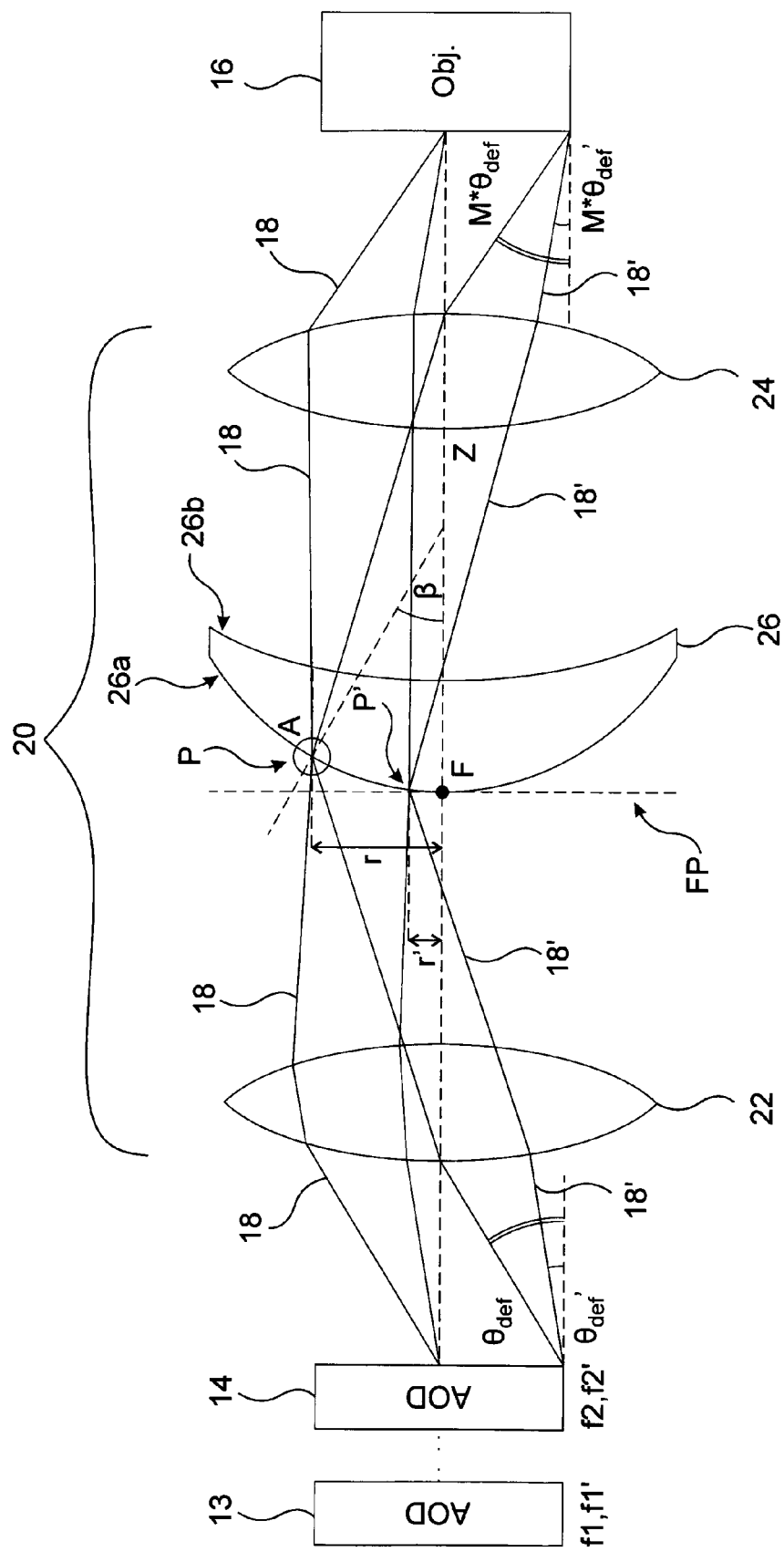
FIG. 2 is a schematic illustration of a compensator system according to the invention arranged between an AOD and an objective.

FIG. 2 illustrates a compensator system 20 according to the invention which is arranged between the second AOD 14 of a pair of consecutive AODs 13, 14 and an objective 16 of an optical system such as a laser scanning microscope (not illustrated). The optical system may comprise various optical elements between the two consecutive AODs 13, 14 as discussed in WO2010/076579, furthermore the optical system typically comprises a second pair of AODs, such that the first pair of AODs serves to deflect an electromagnetic beam 18 in a first lateral direction x while the second pair of AODs deflect the beam 18 in a second lateral direction y perpendicular to the first lateral direction x. For the sake of simplicity only one pair of consecutive AODs 13 and 14 are depicted and discussed hereinafter, however, beam deflection can be calculated analogously in the transversal direction corresponding to a second pair of AODs.

The compensator system 20 comprises a first lens group 22 and a second lens group 24 which are arranged spaced apart from each other downstream of the AOD 14 along a common optical axis Z corresponding to the optical axis of the objective 16. In FIG. 2 the first lens group 22 and the second lens group 24 are illustrated as single lenses for the sake of simplicity, however, both lens groups 22 and 24 may comprise more than one lens, forming achromatic doublets or apochromatic triplets.

A compensator element 26 is arranged between the first lens group 22 and the second lens group 24 such that a first surface 26a of the compensator element 26 lies substantially in the focal plane FP of the first lens group 22 while a second surface 26b of the compensator element 26 faces the second lens group 24.

By way of illustration two deflected beams 18 and 18' are depicted in FIG. 2. The first beam 18 is deflected at an angle $\theta_{def}$ with respect to the optical axis Z by the pair of AODs 13, 14 as a result of the applied deflecting acoustic frequencies $f_1$, $f_2$. The deflection angle $\theta_{def}'$ of the second illustrated beam 18' is obtained by applying acoustic frequencies $f_1'$ and $f_2'$ in the two consecutive AODs 13 and 14 respectively.

The first lens group 22 focuses the first beam 18 to a first point P lying substantially in the focal plane FP of the first lens group 22 at a first distance r from the optical axis Z (and the focus point F of the first lens group 22). The second beam 18' is focused to a second point P' lying substantially in the focal plane FP of the first lens group 22 which is at a second distance r' from the optical axis Z. The distance r, r' from the optical axis Z depends on the deflection angle $\theta_{def}$, $\theta_{def}'$ of the beam 18, 18' exiting the second AOD 14, hence the beams 18, 18' are spatially separated in accordance with their different deflection angle $\theta_{def}$ and $\theta_{def}'$. As will be clear later on, the different deflection angle $\theta_{def}$, $\theta_{def}'$ results in different angular dispersion, hence the beams 18, 18' are also spatially spread with regard to their different angular dispersion, whereby the angular dispersion of the focused beams 18, 18' varies with the distance r, r' from the optical axis Z. Thus the first lens group 22 effectively serves to spatially separate the beams 18, 18' of different angular dispersion.

As mentioned before, the first surface 26a of the compensator element 26 lies substantially in the focal plane FP of the first lens group 22, hence the beams 18, 18' are practically focused onto the first surface 26a of the compensator element 26. It is clear that the deviation between the actual point of focus P, P' and the first surface 26a increases with the increase of the deflection angle $\theta_{def}$, $\theta_{def}'$, however, in spite of this deviation the later field of view can be considerably ameliorated with the compensator system 20 according to the invention as will be clear from the following discussion.

Figure 1:
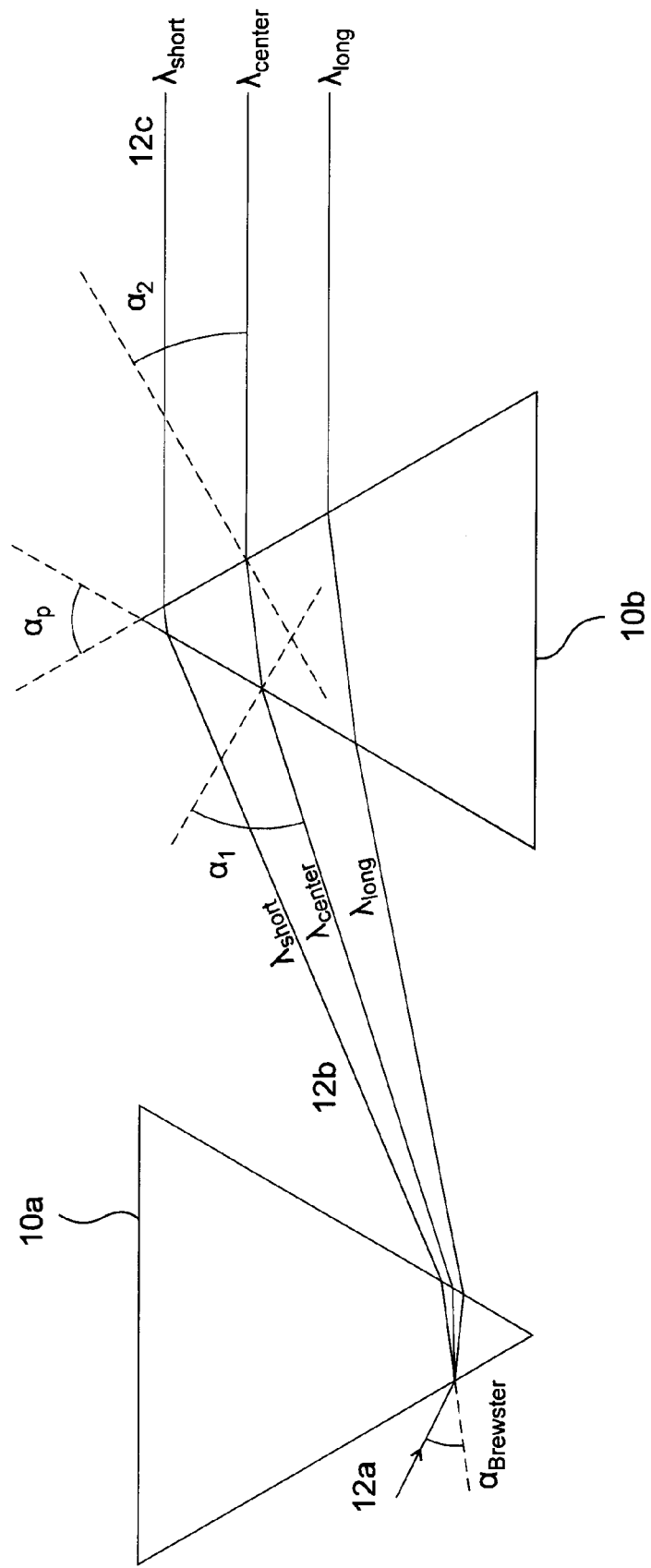
FIG. 1 is a schematic illustration of a two-prism optical arrangement for separating and collimating different wavelength components of an optical beam.
Figure 4:
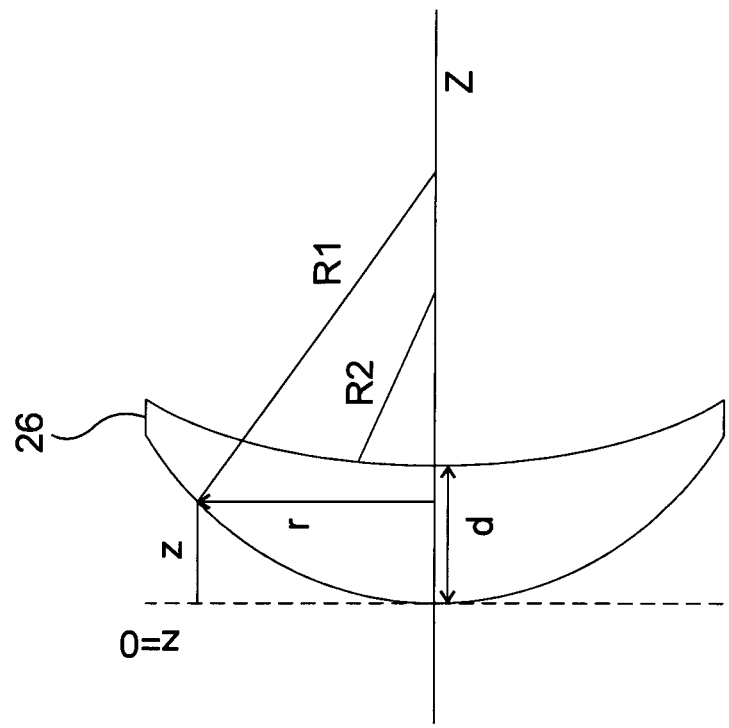
FIG. 4 is a schematic illustration of the compensator element of the compensator system of FIG. 2.
Figure 3:
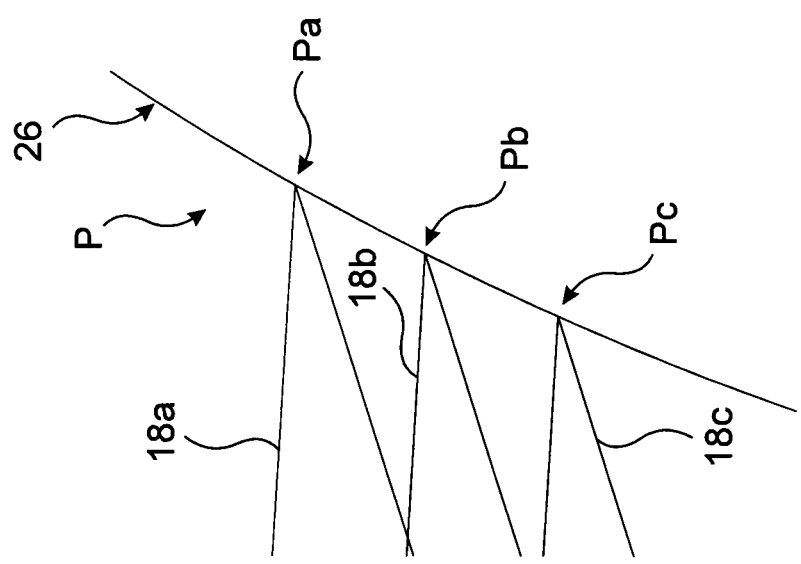
FIG. 3 is an enlarged view of section A of FIG. 2.

Since the beams 18, 18' of different angular dispersion (and deflection angel $\theta_{def}$, $\theta_{def}'$) are practically focused onto different points P, P' of the first surface 26a of the compensator element 26 it is possible to design the compensator element 26 such as to act locally as a prism for compensating the angular dispersion of the beam 18, 18' focused onto a given local surface region. If the point P of focus is enlarged as illustrated in FIG. 3 it can be seen that the different wavelength components 18a, 18b, 18c (i.e. the spectral components of which only three are depicted) of the incident beam 18 are focused into different points Pa, Pb, Pc, which are depicted as lying on the first surface 26a of the compensator element 26, although it is clear from the above discussion that small deviations exist. It is therefore possible to design the first surface 26a and the second surface 26b of the compensator element 26 such as to have nominal radiuses $R_1$ and $R_2$ (see FIG. 4) that together work as local prisms with rotation angles β respective to the common optic axis z, and prism opening angles $α_p$ (see FIG. 1) that vary with the distance from the optical axis Z so as to compensate for the angular dispersion of the spatially separated deflected beams 18, 18'.

The second lens group 24 is arranged so as to substantially parallelise the different wavelength components 18a, 18b, 18c of each deflected beam 18, 18' exiting the compensator element 26. The compensator system composed of the first lens group 22, the compensator element 26 and the second lens group 24 is designed to have an angular magnification M, hence it transforms the deflection angles $θ_{def}$, $θ_{def}'$ to $M*θ_{def}$, $M*θ_{def}'$, thus maintaining the angular variation, of the beams 18, 18' deflected at different acoustic frequencies $f_1$, $f_2$ and $f_1'$, $f_2'$ respectively. The second lens group 24 creates the image at the objective's 16 entrance pupil (not shown). The magnification of the system is engineered to create the same size image of the acousto-optic deflector aperture as that of the objective back aperture.

In the following part of the description a calculation method is proposed for designing the compensator system 20, in particular for calculating the two surfaces 26a, 26b of the compensator element 26.

The deflection angle $θ_1$ in the first acousto-optic deflector 13 is governed by the Bragg equation in isotropic and the Dixon equations in anisotropic interactions.

The Bragg relation [equation (1)] expresses a linear dependence of the deflection angle's sine on the optical wavelength:

$$θ_1(λ) = 2 \cdot \arcsin\left(\frac{λ}{2} \cdot \frac{f_1}{v_a}\right) \quad (1)$$

Here λ is the optical wavelength in the acousto-optic crystal, $θ_1$ is the angle closed by the incident and diffracted optical waves, $f_1$ is the acoustic frequency and $v_a$ is the acoustic velocity in the material. The angular dispersion is the derivative of the deflection angle $θ_1$ with respect to the optical wavelength λ:

$$\frac{dθ_1(λ)}{dλ} = \frac{f_1}{v_a} \frac{1}{\sqrt{1 - λ^2 f_1^2/4v_a^2}} \quad (2)$$

In the anisotropic case the Dixon equations indicate that the deflection angle $θ_1$ depends on the propagation directions of the incident optical beam (not depicted) and acoustic waves relative to the crystal's axes, expressed with the angle $γ_1$ between the incident optical beam's wave vector and the crystallographic [100] axis and the angle $α_0$ closed by the acoustic wave vector and the [1-10] axis:

$$θ_1(λ, f_1) = γ_1 - \arctan\left(\frac{ne(γ_1, λ) \cdot \sin(γ_1) - \frac{f_1 λ}{v_a} \cos(α_0)}{ne(γ_1, λ) \cdot \cos(γ_1) + \frac{f_1 λ}{v_a} \sin(α_0)}\right) \quad (3)$$

Equation (3) is valid for acoustically rotated configuration ($α_0 \neq 0$) and when the interaction plane coincides with the plane determined by the [001] and the [110] (or [1-10]) crystallographic axes.

Figure 5:
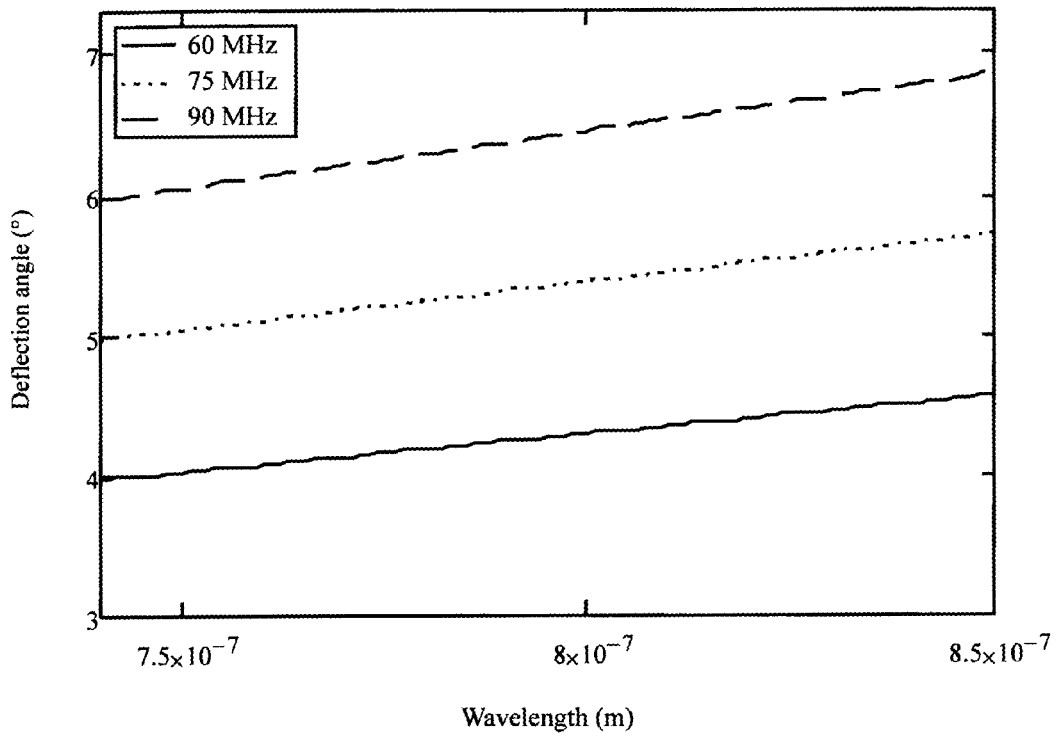
FIG. 5 is a diagram showing the wavelength dependence of the deflection angle produced by an AOD at different acoustic frequencies.
Figure 6:
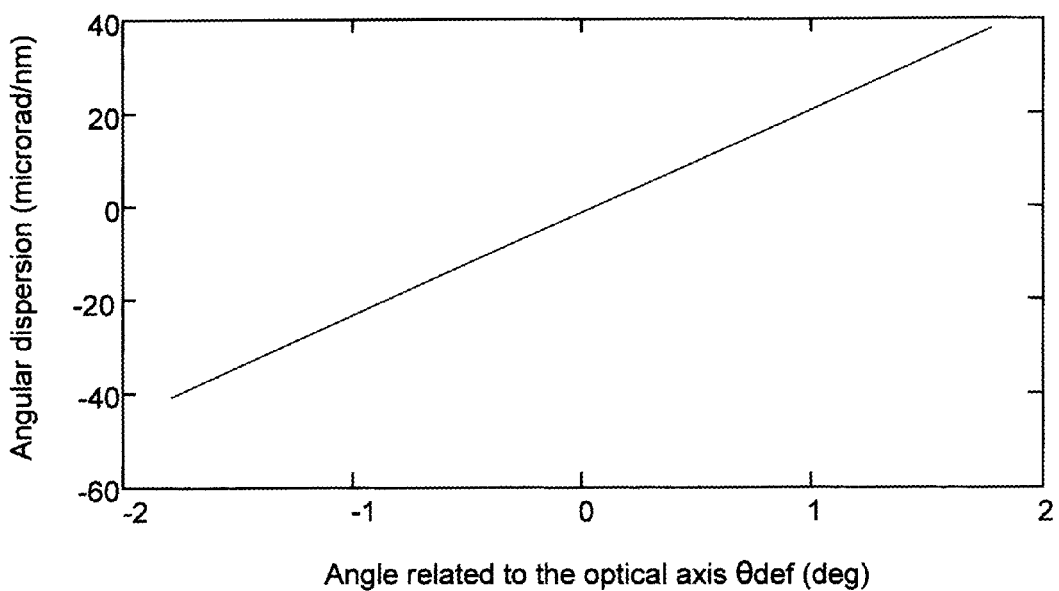
FIG. 6 is a calculated diagram showing the dependence of the angular dispersion ($d\theta_1/d\lambda$) on the deflection angle ($\theta_1$) when a single deflector is used to deflect the beam in a given x-z or y-z plane.

The angular dispersion in this case is also the derivative of the function of (3) with respect to the wavelength λ. The wavelength dependence of the deflection angle $θ_1$ outside the first AOD 13 at different acoustic frequencies $f_1$ is shown in FIG. 5. The dependence on the wavelength λ is close to linear, whereas the slope $dθ/dλ$ representing the angular dispersion clearly increases with increasing acoustic frequency $f_1$, and increasing deflection angle $θ_1$ as shown in FIG. 6.

As mentioned above, in advanced acousto-optic deflection systems the deflection in a given direction (perpendicular to the optical axis Z of the optical system) is realized with two consecutive AODs 13, 14 to also provide lens effect with controllable focus. This arrangement can also compensate for the angular dispersion in the beams 18, 18' deflected by both AODs 13, 14. When using two AODs 13, 14 of similar material and interaction configuration, the angular dispersion is completely cancelled in a given deflection direction. This direction is conveniently chosen to coincide with the optical axis Z for the subsequent optics (practically the objective 16) which leads the deflected beams 18, 18' to the target. The angular dispersion is only partially cancelled in deflection directions not parallel to this axis z, moreover, the remaining dispersion is increasing when the deflection angle $θ_{def}$, $θ_{def}'$ departs from the axis z.

There are basically two configurations that can be used in this setup: the second AOD 14 of the pair is set for the same input and output polarization as the first AOD 13. In this case the polarization of the light must be rotated by 90° with a half wave plate between the two AODs 13, 14 in order to have the correct entrance polarization in the second AOD 14. Moreover, to fulfil the criterion of keeping a point on the same place during focusing, the direction of the acoustic wave in the second AOD 14 must be opposite to that in the first.

In the second AOD 14 the incident beam 18, 18' is already dispersed, so the incidence angle is wavelength dependent and also depends on the acoustic frequency $f_1$ of the first AOD 13—$γ_{12}(λ, f_1)$. If the second AOD 14 uses the same configuration as the first AOD 13, then equation (3) can be used with the new incidence angles.

$$θ_2(λ, f_1, f_2) = \quad (4)$$
$$γ_{12}(λ, f_1) - \arctan\left(\frac{ne(γ_{12}(λ, f_1), λ) \cdot \sin(γ_{12}(λ, f_1)) - \frac{f_2 λ}{v_a} \cos(α_0)}{ne(γ_{12}(λ, f_1), λ) \cdot \cos(γ_{12}(λ, f_1)) + \frac{f_2 λ}{v_a} \sin(α_0)}\right)$$

The new incidence angles can be calculated from equation (3) by adding a fix angle δ representing the orientation of the second AOD 14 with respect to the beam deflected by the first AOD's 13 crystal at a given acoustic frequency $f_1$ taken as the reference—it is usually the centre frequency of the acoustic band.

$$\gamma_{12}(\lambda, f_1) = \theta(\lambda, f_1) - \delta \quad (5)$$

In the second configuration the second AOD 14 operates with 90° rotated incident and output polarization as the first AOD 13. Therefore the output polarization of the first AOD 13 must not be rotated (the half wave plate can be omitted). Moreover the acoustic wave direction should be the same in the second AOD 14 as in the first AOD 13, it should not be rotated. The deflection angle $\theta_2$ after the second AOD 14 can be calculated by solving equation (6).

The angle $\theta_2$ can be expressed analytically too, as one of the radicals of the fourth grade equation, but it is complicated. Hence we propose to solve the equation numerically:

$$\theta_2(\lambda, f_1, f_2) = -\gamma_{12}(\lambda, f_1) + +$$

$$\text{root}\left( n_o^2(\lambda) - \left(\frac{f_2\lambda}{v_a}\right)^2 - \frac{n_e^2(\lambda) \cdot n_o^2(\lambda)}{n_e(\lambda) \cdot \cos(\theta_2) + n_o(\lambda) \cdot \sin(\theta_2)} - - \right.$$

$$\left. \frac{n_o(\lambda) n_e(\lambda)}{\sqrt{n_e^2(\lambda) \cdot \cos^2(\theta_2) + n_o^2(\lambda) \cdot \sin^2(\theta_2)}} \cos(\gamma_{12}(\lambda, f_1) - \theta_2) \right) \quad (6)$$

Otherwise the operation of the two setups using different incident polarizations and acousto-optic cell rotations are comparable, and can be described using almost the same physical picture.

If the optical system is a microscope the deflection angle $\theta_2$ is transformed into a focal point position on the target by an optical chain. The last element of this chain is the microscope objective 16. Conveniently, the position coordinates are defined as the x, y and z distances from an origin. This origin is the point where the objective's 16 optical axis Z intersects the principal focal plane. The deflected beam direction that coincides with this optical axis Z needs to be selected.

The second AOD 14 also has a central acoustic frequency, usually the center of the working acoustic band. In both setup variations particular acoustic frequencies $f_1$ and $f_2$ can be selected in the two consecutive AODs 13, 14, such that the beam 18, 18' deflected twice does not contain angular dispersion after the second AOD 14, because the second AOD 14 exactly cancels out the dispersion introduced by the first AOD 13. This occurs when the frequencies $f_1$ and $f_2$ are nearly equal The beam without angular dispersion is conveniently set to coincide with the optical axis Z of the optical system subsequent to the second AOD 14.

The angular dispersion in the beams 18, 18' diffracted at other acoustic frequencies $f_1$ and $f_2$ in the first and second AOD 13, 14 respectively, is not zero, and is depending on the frequency difference:

$$\frac{\partial \theta_2(\lambda, f_1, f_2)}{\partial \lambda} = \frac{\partial \gamma_{12}(\lambda, f_1)}{\partial \lambda} -$$

$$\frac{\partial}{\partial \lambda} \arctan\left( \frac{ne(\gamma_{12}(\lambda, f_1), \lambda) \cdot \sin(\gamma_{12}(\lambda, f_1)) - \frac{f_2\lambda}{v_a}\cos(\alpha_0)}{ne(\gamma_{12}(\lambda, f_1), \lambda) \cdot \cos(\gamma_{12}(\lambda, f_1)) + \frac{f_2\lambda}{v_a}\sin(\alpha_0)} \right) \quad (7)$$

Formally the optical axis z can be found where the right side of equation (7) is equal to zero. With $\delta=0$ and identical AODs 13, 14 this occurs at $f_1=f_2$. With increasing frequency difference $f_1-f_2$, both the angle $\theta_2$, and the angular dispersion increases, following the prediction of equation (6).

The visible deflection angles $\theta_{def}$, $\theta_{def}'$ outside the second AOD 14 can be calculated using its wavelength dependent refractive index, which is slightly different in the two cases because of the different polarization states.

$$\theta_{def}(\lambda, f_1, f_2) = a \sin [n(\lambda) \cdot (\theta_2(\lambda, f_1, f_2) - \theta_2(\lambda_c, f_{c1}, f_{c2}))] \quad (8)$$

Here $\lambda_c$, $f_{c1}$, $f_{c2}$ are the central optical wavelength and acoustic frequencies, respectively, that determine the optical axis Z after the AODs 13, 14.

By generalization of the angular dispersion compensation method based on a prism 10 it is possible to design the optimized compensator system 20 that compensates for the above described spatially variable angular dispersion. This compensator system 20 consists of spherical and aspheric lenses and fulfils the following criteria:

It creates the image of the second AOD 14 of an AOD pair into a given plane: the beams 18, 18' deflected at different acoustic frequencies will overlap each other in this plane, but each will have different angle of propagation $M*\theta_{def}$, $M*\theta_{def}'$ at this plane. Ideally this plane coincides with the entrance pupil of the microscope objective 16 in a microscope system.

The different wavelength components 18a, 18b, 18c in each deflected beam 18 are parallelized as much as possible after the last lens group 24 of the compensator system 20, but the angular variation of the beams 18, 18' deflected at different acoustic frequencies $f_1$, $f_2$ and $f_1'$, $f_2'$ is maintained.

As discussed above the compensator system 20 comprises three main parts: the first lens group 22 focusing the deflected beams 18, 18' into the focal plane FP of the first lens group 22, the compensator element 26 compensating for the angular dispersion of the deflected beams 18, 18' and the third lens group 24 parallelizing the spectral components 18a, 18b, 18c and creating the image at the objective's 16 entrance pupil.

The compensator element 26 can be fabricated as a glass piece with a first surface 26a of radius $R_1$ and a second surface 26b of radius $R_2$.

As explained before, the first lens group 22 focuses the deflected beams 18, 18' into its focal plane FP, where the deflected beams 18, 18' are spatially separated, and the wavelength components 18a, 18b, 18c within each deflected beam 18 are separated too, but with at least about one order of magnitude less amount, typically by one-two orders of magnitude less amount. The first lens group 22 of focal length $foc_1$ transforms the deflection angle $\theta_{def}$, $\theta_{def}'$ into spatial distance r, r' measured from the optical axis Z in the focal plane FP:

$$r(\lambda, f_1, f_2) = \theta_{def}(\lambda, f_1, f_2) \cdot foc_1 \quad (9)$$

The angular dispersion into spatial spread of the spectral components 18a, 18b, 18c can be described as follows:

$$\Delta r(\lambda_1, \lambda_2, f_1, f_2) = (\theta_{def}(\lambda_1, f_1, f_2) - \theta_{def}(\lambda_2, f_1, f_2)) \cdot foc_1 \quad (10)$$

The angular separation of the spectral components 18a, 18b, 18c increases with increasing distance r from the optical axis Z. The main angle, which can be associated with the frequency components is $r(\lambda)/foc_1$ To compensate effectively for the angular dispersion a prism 10 is the most forehand solution. The amount of angular dispersion, which a prism 10 can compensate for, can be matched to a given dispersion value by properly selecting the incidence angle $\alpha_1$ and the prism opening angle $\alpha_P$. The output angle after the prism is given by:

$$\alpha_2(\alpha_1, \alpha_P, \lambda) = \operatorname{asin}\left(n(\lambda)\sin\left(\alpha_P - \operatorname{asin}\left(\frac{\sin(\alpha_1(\lambda))}{n(\lambda)}\right)\right)\right) \quad (11)$$

The wavelength dependent incidence angle $\alpha_1$ can be determined from the tilt angle $\beta$ of the prism 10 (i.e. the angle between the optical axis Z and the angle of incidence) and the wavelength dependent angle $\theta_{def}$ of propagation:

$$\alpha_1(\lambda) = \theta_{def}(\lambda, f_1, f_2) - \beta \quad (12)$$

and the total deflection angle of the prism 10:

$$\Delta\alpha(\alpha_1, \alpha_P, \lambda, f_1, f_2) = \theta_{def}(\lambda, f_1, f_2) + \quad (13)$$
$$\beta - \operatorname{asin}\left(n(\lambda)\sin\left(\alpha_P - \operatorname{asin}\left(\frac{\sin(\theta_{def}(\lambda, f_1, f_2) - \beta)}{n(\lambda)}\right)\right)\right) - \alpha_P$$

The zero angular dispersion requirement after the prism can be expressed as:

$$\frac{\partial[\Delta\alpha(\alpha_1, \alpha_P, \lambda, f_1, f_2)]}{\partial\lambda} = 0 \quad (14)$$

To compensate for an angular dispersion that increases with the distance r from the optical axis Z both the tilt angle $\beta$ and the prism opening angle $\alpha_P$ should be varied: the two functions $\beta(r)$ and $\alpha_P(r)$ can be computed.

From these relations the nominal radiuses $R_1$ and $R_2$ of the first surface 26a and of the second surface 26b that together work like prisms with varying and matching tilt angles (or incidence angles) and opening angles, can be calculated.

In the first approach, where these surfaces 26a, 26b are assumed to be spherical surfaces with perfect symmetry around the above defined optical axis, the radius $R_1$ of the first surface 26a can be expressed as:

$$R_1 = r/\sin[\beta(r)] \quad (15)$$

and the radius $R_2$ of the second surface 26b can be expressed as:

$$R_2 = r/\sin\left[\alpha_P(r) - \operatorname{asin}\left(\frac{r}{R_1}\right)\right] = r/\sin[\alpha_P(r) - \beta(r)]. \quad (16)$$

The optimal surfaces 26a, 26b are however not spherical surfaces, but they can be expressed as aspheric and conic surfaces with the main radii given by equations (15) and (16):

$$z = \frac{\frac{1}{R_1}r^2}{1 + \sqrt{1 - (1 + k_1)\frac{r^2}{R_1}}} + \sum_{n=1:6} a_n r^n \quad (17)$$

The conic and aspheric parameters (indicated in FIG. 4) are determined by proper optimization. The value of the radius $R_1$, $R_2$, and minimum glass thickness d at the optical axis Z is also determined with optimization using the optimization algorithms of Zemax. Two merit functions are consecutively used, one containing the angular dispersion and aperture before the objective 16 and a second targeting minimum spot size in the sample plane (the focal plane of the objective 16). Iteration of these two leads to optimized surfaces 26a, 26b for the given material and other optical parameters of the compensator system 20: distances between the lenses and focal lengths. The compensator element 26 can be made of any highly dispersive glass, e.g. SF10, SF 11 etc. For each material separate optimization is required.

The second lens group 24 of the setup typically comprises a single lens which accounts for imaging the deflected beams 18, 18' onto the objective's 16 back aperture and for filling the objective aperture at each deflection angle $M^*\theta_{def}$, $M^*\theta_{def}'$. Its focal length and position are also optimized. For example an Olympus scan lens of 210 mm focal length may be used at this place, when the compensator system 20 is used in combination with a LumPlan 20× Olympus objective. As is clear from the above equations the parameters of the custom surfaces 26a, 26b of the compensator element 26 can be optimized for a variety of, commercially available lenses preselected for the second lens group 24 of the angular compensator system 20. Optimization and analysis must be performed for each combination to give the highest field of view within a given angular resolution range.

When compared with a conventional setup which would use a simple telescopic lens system instead of the inventive compensator system 20, we have found that using the inventive compensator system 20 it was possible to obtain 700 μm lateral field of view whereas using a conventional telescopic lens system only 420 μm lateral field of view was obtained with the same focused spot size and dispersion at the edges of this area.

It is clear that the same equations can be used to calculate the surface 26a, 26b of the compensator element 26 in a direction perpendicular to x, say y, if a second pair of AODs are used to deflect the beams 18, 18' in a lateral direction (y) perpendicular to the deflection direction (x) occasioned by the first pair of AODs 13, 14.

Figure 7:
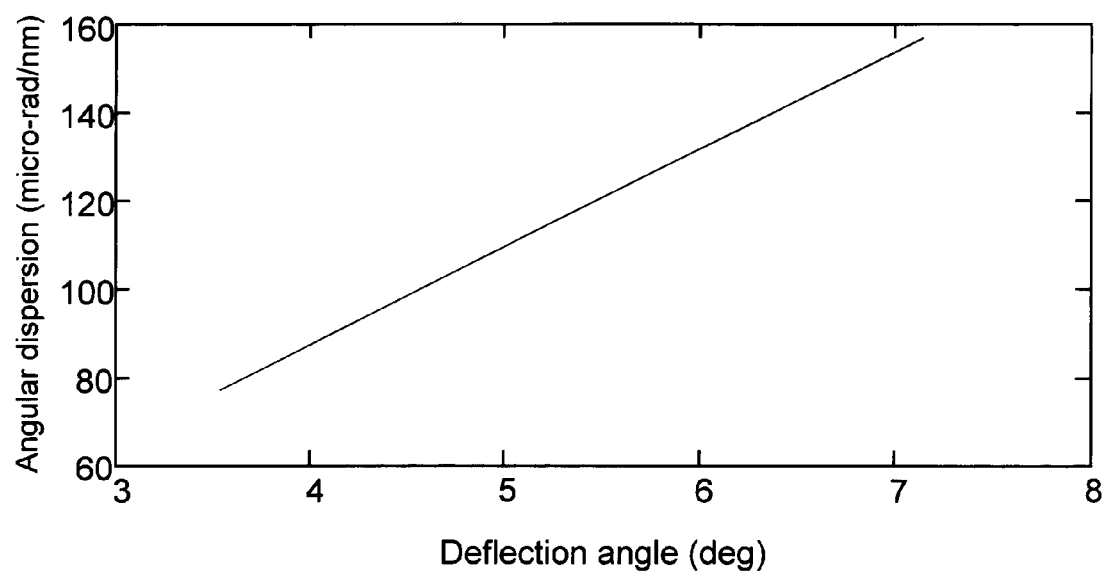
FIG. 7 is a diagram showing dependence of the angular dispersion ($d\theta_{def}/d\lambda$) on the deflection angle ($\theta_{def}$) when two consecutive deflectors are used to deflect the beam in a given x-z or y-z plane.

An arrangement similar to that depicted in FIGS. 2 and 3 can be used to compensate the angular dispersion introduced by a single deflector 13 or 14. When one compares the deflection angle dependence of the arrangements containing one and two deflectors 13, 14 (FIGS. 6 and 7) it will be obvious that the dependence is linear in both cases, with certain differences:

1. in the one deflector case the curve does not pass through the origin, so nonzero angular dispersion is present at all deflection angles
2. the slope of the curve is twice in the single deflector case than that in the two-deflector case The first difference implies that the arrangement of the dispersion compensator 20 is not so cylindrically symmetric around an axis Z as that in FIG. 2, but the compensator element 26 must be tilted and shifted accordingly to compensate for the nonzero angular dispersions in both x-z and y-z planes. The second difference between the two arrangements implies that the shape of the compensating element 26, particularly the radii of curvature are different in the single deflector case from the two-deflector case. The tilt angles β and the curvature radii can be calculated exactly using the method given above in detail for the two-deflector/deflection plane configuration. The surfaces 26a, 2b of the compensator element 26 will not be perpendicular to the axis formed by the common axis of the two lens groups 22 and 24 that should also be arranged to have common axis with the objective 16.

The above-described embodiments are intended only as illustrating examples and are not to be considered as limiting the invention. Various modifications will be apparent to a person skilled in the art without departing from the scope of protection determined by the attached claims.

The invention claimed is:

1. Compensator system adapted to compensate for the angular dispersion of electromagnetic beams deflected by at least one acousto-optic deflector of an optical system, wherein the angular dispersion of each deflected beam is dependent on the deflection angle obtained by the deflecting acoustic frequency of the acousto-optic deflector, characterised in that the compensator system comprises:

a first lens group for spatially separating the deflected beams of different deflection angle and angular dispersion by focusing the beams into the focal plane, a compensator element having a first surface and a second surface, and being arranged such that the first surface of the compensator element lies in the focal plane of the first lens group, and the first and second surfaces of the compensator element have nominal radii R1 and R2 that together work as local prisms with tilt angles $\beta$ and prism opening angles $\alpha_p$ that vary with the distance r from the optical axis, R1 and R2 being defined by equations $R_1 = r/\sin[\beta(r)]$ and $R_2 = r/\sin[\alpha_P(r) - \beta(r)]$ a second lens group arranged so as to substantially parallelise the different wavelength components of each deflected beam exiting the compensator element while maintaining the angular variation of the beams deflected at different acoustic frequencies.

2. The compensator system according to claim 1, wherein the compensator element is adapted to compensate for the angular dispersion of a beam deflected by at least one pair of acousto-optic deflectors.

3. The compensator system according to claim 1, wherein the first lens group consists of a double lens and the second lens group consists of a single lens.

4. An optical system which includes the compensator system according to claim 1.

5. The optical system according to claim 4, wherein the optical system comprises two consecutive acousto-optic deflectors and a compensator system is arranged after each acousto-optic deflector.

6. The optical system according to claim 5, wherein the optical system comprises at least a pair of acousto-optic deflectors and the compensator element of the compensator system is adapted to compensate for the angular dispersion of a beam deflected by at least the pair of acousto-optic deflectors.

7. Method for compensating for the angular dispersion of electromagnetic beams deflected by at least one acousto-optic deflector of an optical system, wherein the angular dispersion of each deflected beam is dependent on the deflection angle obtained by the deflecting acoustic frequency, characterised by spatially separating the deflected beams of different deflection angle and angular dispersion by focusing the beams via a first lens group into the focal plane of the first lens group, providing a compensator element having a first surface and a second surface, and being arranged such that the first surface of the compensator element lies in the focal plane of the first lens group, and the first and second surfaces of the compensator element have nominal radii R1 and R2 that together work as local prisms with tilt angles $\beta$ and prism opening angles $\alpha_p$ that vary with the distance r from the optical axis, R1 and R2 being defined by equations $R_1 = r/\sin[\beta(r)]$ and $R_2 = r/\sin[\alpha_P(r) - \beta(r)]$ compensating for the angular dispersion of the spatially separated deflected beams with the compensator element in accordance with the angular dispersion of the given beam, parallelising the spectral components of each deflected beam while maintaining the angular variation of the beams deflected at different acoustic frequencies.

8. The method according to claim 7, wherein the beams are deflected by at least a pair of acousto-optic deflectors of the optical system.

* * * * *